United States Patent
Park et al.

(10) Patent No.: US 10,599,264 B2
(45) Date of Patent: Mar. 24, 2020

(54) TOUCH SCREEN PANEL HAVING SYNCHRONIZED CLOCK AND TOUCH DRIVING SIGNALS

(71) Applicant: Samsung Display Co., Ltd., Yongin-si, Gyeonggi-do (KR)

(72) Inventors: Seung Nam Park, Yongin-si (KR); Jeong Kyoo Kim, Yongin-si (KR); Kyung Youl Min, Yongin-si (KR); Young Uk Won, Yongin-si (KR)

(73) Assignee: Samsung Display Co., Ltd. (KR)

( * ) Notice: Subject to any disclaimer, the term of this patent is extended or adjusted under 35 U.S.C. 154(b) by 451 days.

(21) Appl. No.: 15/182,415

(22) Filed: Jun. 14, 2016

(65) Prior Publication Data

US 2017/0108987 A1 Apr. 20, 2017

(30) Foreign Application Priority Data

Oct. 16, 2015 (KR) ........................ 10-2015-0144790

(51) Int. Cl.
*G06F 3/041* (2006.01)
*G06F 3/044* (2006.01)
*H02M 3/07* (2006.01)

(52) U.S. Cl.
CPC ............ *G06F 3/0418* (2013.01); *G06F 3/044* (2013.01); *H02M 3/07* (2013.01)

(58) Field of Classification Search
CPC .... G06F 3/044; G06F 3/04182; G06F 3/0418; H02M 3/07
USPC ........................................ 345/173; 178/18.06
See application file for complete search history.

(56) References Cited

U.S. PATENT DOCUMENTS

| 9,106,127 B2 | 8/2015 | Chung | |
|---|---|---|---|
| 2011/0227633 A1* | 9/2011 | Mo | G06F 3/044 327/517 |
| 2012/0313866 A1* | 12/2012 | Ha | G06F 3/044 345/173 |
| 2013/0241630 A1* | 9/2013 | Klein | G06F 3/044 327/536 |
| 2013/0265277 A1* | 10/2013 | Yeh | G06F 3/044 345/174 |
| 2013/0271420 A1* | 10/2013 | Chen | G06F 3/044 345/174 |
| 2014/0028581 A1* | 1/2014 | Lin | H03K 5/02 345/173 |
| 2014/0043293 A1* | 2/2014 | Hotelling | G06F 3/0416 345/174 |
| 2014/0068301 A1* | 3/2014 | Watanabe | G06F 1/3234 713/322 |

(Continued)

FOREIGN PATENT DOCUMENTS

KR 10-1024632 B1 3/2011

*Primary Examiner* — Adam J Snyder
(74) *Attorney, Agent, or Firm* — Innovation Counsel LLP

(57) ABSTRACT

A touch screen panel includes a plurality of sensing electrodes arranged in a touch active area, a charge pump circuit for generating an output voltage based on an input voltage and at least one clock signal, a clock signal generator for generating the clock signal, and a touch driver for generating touch driving signals by using the output voltage and applying the touch driving signals to the sensing electrodes. In the touch screen panel, the clock signal and the touch driving signals are synchronized with each other.

14 Claims, 3 Drawing Sheets

(56) References Cited

U.S. PATENT DOCUMENTS

| | | | |
|---|---|---|---|
| 2014/0103982 A1* | 4/2014 | Lin | H03K 5/153 327/180 |
| 2014/0104904 A1* | 4/2014 | Lin | H02M 3/073 363/61 |
| 2015/0084923 A1* | 3/2015 | Kang | G06F 3/044 345/174 |
| 2015/0188419 A1* | 7/2015 | Lin | H02M 3/073 327/536 |
| 2015/0188420 A1* | 7/2015 | Lin | H02M 3/07 327/536 |

* cited by examiner

TOUCH SCREEN PANEL HAVING SYNCHRONIZED CLOCK AND TOUCH DRIVING SIGNALS

RELATED APPLICATIONS

This application claims priority to and the benefit of Korean Patent Application No. 10-2015-0144790, filed on Oct. 16, 2015, in the Korean Intellectual Property Office, the entire contents of which are incorporated herein by reference in their entirety.

BACKGROUND

1. Field

An aspect of the present disclosure relates to a touch screen panel.

2. Description of the Related Art

There are known various methods of implementing touch screen panels, including a resistive layer method, an optical sensing method, and an electrostatic capacitance method. A touch screen panel using the electrostatic capacitance method includes a plurality of sensing electrodes, and senses changes in capacitance formed in the sensing electrodes when a user's finger or stylus pen comes in contact with the sensing electrodes, thereby detecting a touch position.

Specifically, the touch screen panel may include sensing electrodes, a touch driver, and a charge pump circuit. The touch driver generates touch driving signals by using an output voltage supplied from the charge pump circuit, and applies the touch driving signals to the sensing electrodes. The touch screen panel senses changes in capacitance by sensing touch sensing signals corresponding to the touch driving signals.

However, the touch screen panel is influenced by power noise due to driving of the charge pump circuit. Specifically, a noise is generated corresponding to a change in voltage in the charge pump circuit. The generated noise changes capacitance between the sensing electrodes, and therefore, a touch error may occur.

In a conventional touch screen panel, a charge pump circuit and a touch driver are asynchronously driven, and therefore, the influence of power noise is aperiodically generated based on touch driving timing. As touch screen panels become large in size, touch drivers are driven at a high voltage so as to obtain a high signal-to-noise ratio (SNR). Hence, the influence of power noise increases. Accordingly, a plan for reducing power noise is required.

SUMMARY

According to an aspect of the present disclosure, there is provided a touch screen panel, including: a plurality of sensing electrodes arranged in a touch active area; a charge pump circuit configured to generate an output voltage based on an input voltage and at least one clock signal; a clock signal generator configured to generate the clock signal; and a touch driver configured to generate touch driving signals by using the output voltage, and apply the touch driving signals to the sensing electrodes, wherein the clock signal and the touch driving signals are synchronized with each other.

Reference timing of the clock signal and reference timing of the touch driving signals may be set to correspond to each other. The reference timing of the clock signal may be at least one of a rising edge and a falling edge of the clock signal.

The touch driver may sequentially supply the touch driving signals to driving channels corresponding to the sensing electrodes. The reference timing of the touch driving signals may be a start point of a sensing time per channel, during which the touch driving signals are supplied to each of the driving channels. A half period of the clock signal and the sensing time per channel may be set to be the same. A period of the clock signal and the sensing time per channel may be set to be the same.

The clock signal generator may generate the clock signal synchronized based on the touch driving signals. The touch driver may generate the touch driving signals synchronized based on the clock signal. The clock signal and the touch driving signals may be synchronized based on a reference synchronization signal.

The sensing electrodes may include Tx electrodes and Rx electrodes intersecting the Tx electrodes. The touch driver may include a touch driving circuit configured to supply the touch driving signals to the Tx electrodes; and a touch sensing circuit configured to sense touch sensing signals corresponding to the touch driving signals through the Rx electrodes.

The touch screen panel may further include a touch controller configured to detect a touch position based on touch sensing signals other than touch sensing signals overlapped with transfer sections of the clock signal among the touch sensing signals. The touch controller may detect the touch position from a representative value obtained by averaging the other touch sensing signals.

The clock signal generator may generate a first clock signal and a second clock signal obtained by inverting the first clock signal. The charge pump circuit may include a voltage pumping unit configured with a plurality of capacitors and transfer transistors corresponding to the respective capacitors. The voltage pumping unit may generate the output voltage by gradually boosting the input voltage based on the first and second clock signals.

BRIEF DESCRIPTION OF THE DRAWINGS

Example embodiments are now described more fully hereinafter with reference to the accompanying drawings; however, they may be embodied in different forms and should not be construed as limited to the embodiments set forth herein. Rather, these embodiments are provided to help convey the scope of the example embodiments to those skilled in the art.

In the drawing figures, dimensions may be exaggerated for clarity of illustration. When an element is referred to as being "between" two elements, it may be the only element between the two elements, or one or more intervening elements may also be present. Like reference numerals refer to like elements throughout.

DETAILED DESCRIPTION

Hereinafter, exemplary embodiments of the present disclosure are described in detail with reference to the accompanying drawings.

Figure 1:
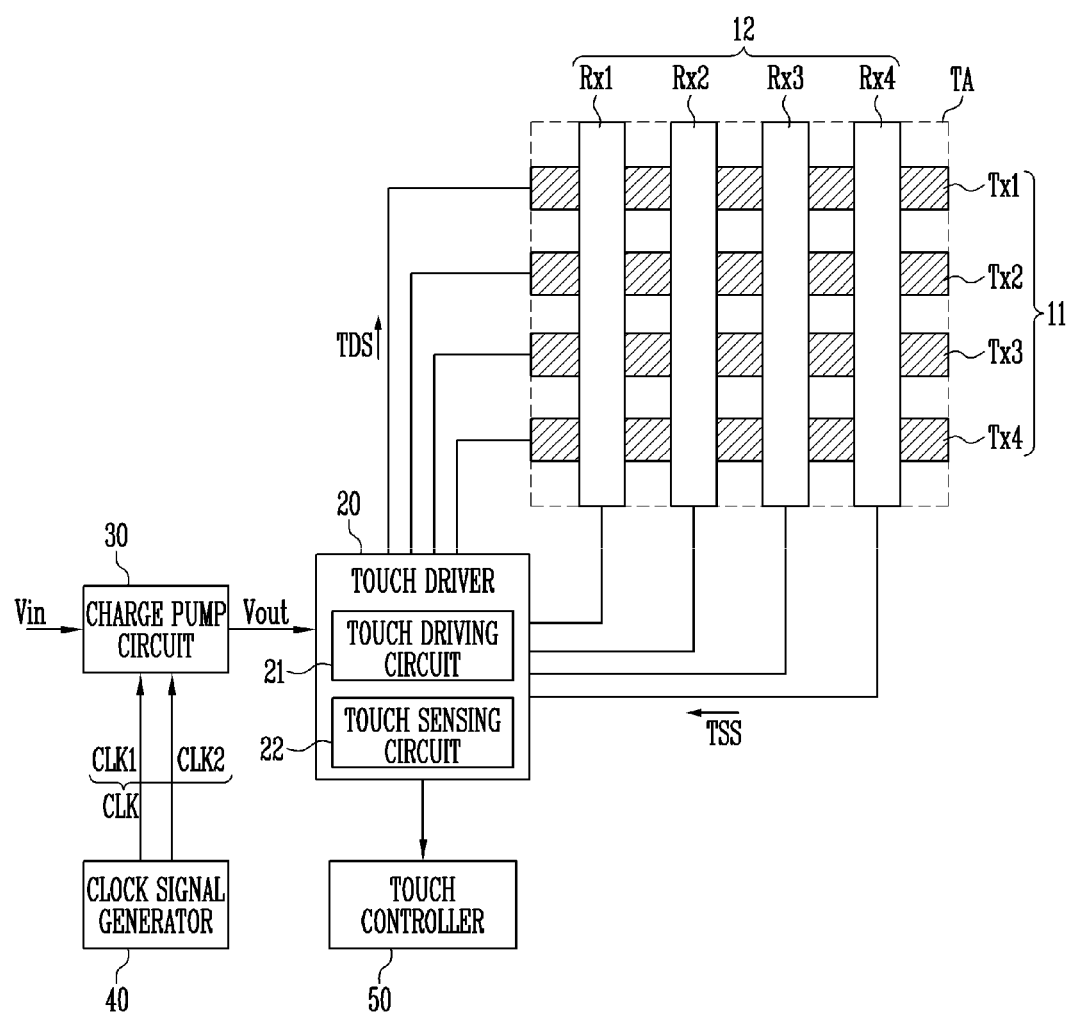
FIG. 1 is a schematic configuration diagram of a touch screen panel according to an embodiment of the present disclosure.

FIG. 1 is a schematic configuration diagram of a touch screen panel according to an embodiment of the present disclosure. Referring to FIG. 1, the touch screen panel may include sensing electrodes 11 and 12, a touch driver 20, a charge pump circuit 30, a clock signal generator 40, and a touch controller 50.

The sensing electrodes 11 and 12 are a plurality of conductive patterns for sensing touch inputs, and may be distributed and arranged in predetermined patterns in a touch active area TA. In this embodiment, the sensing electrodes 11 and 12 may include Tx electrodes 11 and Rx electrodes 12 intersecting the Tx electrodes 11. The Tx electrodes 11 and the Rx electrodes 12 may be formed in different layers or in the same layer on a transparent substrate (not shown). The Tx electrodes 11 and the Rx electrodes 12 may be formed of a transparent conductive material. In this case, the transparent conductive material may include indium tin oxide (ITO), indium zinc oxide (IZO), carbon nano tube (CNT), graphene, etc.

Various examples known in the art may be applied to the shape, material, and structure of the sensing electrodes 11 and 12, but the present disclosure is not limited thereto. For example, it is illustrated in FIG. 1 that the Tx electrodes 11 and the Rx electrodes 12 are arranged in a shape in which they orthogonally intersect each other, but this is merely an embodiment. In addition, the Tx electrodes 11 and the Rx electrodes 12 may be implemented in a shape in which they intersect each other in a geometrical form (e.g., concentric lines and radial lines of a polar coordinate arrangement). Also, it is illustrated in FIG. 1 that the Tx electrodes 11 and the Rx electrodes 12 are arranged in a bar shape, but this is merely an embodiment. In addition, the Tx electrodes 11 and the Rx electrodes 12 may be implemented in a diamond shape, a mesh pattern, etc.

The touch driver 20 generates touch driving signals TDS by using an output voltage Vout supplied from the charge pump circuit 30, and applies the generated touch driving signals TDS to the sensing electrodes 11 and 12. Specifically, the touch driver 20 may include a touch driving circuit 21 for sequentially supplying the touch driving signals TDS to the respective Tx electrodes 11. The touch driving circuit 21 may generate the touch driving signals TDS of a pulse wave having an amplitude corresponding to the output voltage Vout. Also, the touch driving circuit 21 may sequentially supply the touch driving signals TDS to driving channels corresponding to the Tx electrodes 11. A sensing time per channel, for which the touch driving signals TDS are supplied to each of the driving channel, may be previously set. In this embodiment, the Tx electrodes 11 and the driving channels correspond to each other one by one. If it is assumed that the number of the Tx electrodes 11 is four, the touch driving circuit 21 may supply the touch driving signals TDS to a first Tx electrode Tx1 during a first time that is a first sensing time per channel, supply the touch driving signals TDS to a second Tx electrode Tx2 during a second time that is a second sensing time per channel, supply the touch driving signals TDS to a third Tx electrode Tx3 during a third time that is a third sensing time per channel, and supply the touch driving signals TDS to a fourth Tx electrode Tx4 during a fourth time that is a fourth sensing time per channel.

Also, the touch driver 20 may include a touch sensing circuit 22 for sensing touch sensing signals TSS corresponding to the touch driving signals TDS from the Rx electrodes 12 (e.g., Rx1, Rx2, Rx3 and Rx4). Here, the touch sensing signals TSS are electrical signals related to capacitance, and have the substantially the same timing as the touch driving signals TDS. For example, when the touch driving signals TDS are supplied to the sensing electrodes 11 and 12 when no touch is generated, the touch sensing signals TSS have a certain waveform according to the capacitance formed between the Tx electrodes 11 and the Rx electrodes 12. If a touch is generated in the sensing electrodes 11 and 12, a change in the touch sensing signals TSS corresponding to a change in capacitance is generated at the position where the touch is generated. The touch sensing circuit 22 may include an analog-to-digital converter (ADC) for converting the sensed touch sensing signals TSS into digital form. The touch sensing circuit 22 may provide the touch controller 50 with data values obtained by digitizing the touch sensing signals TSS.

The charge pump circuit 30 generates an output voltage Vout based on an input voltage Vin input from the outside and at least one clock signal CLK. The generated output voltage Vout is supplied to the touch driver 20. Specifically, the charge pump circuit 30 includes a plurality of capacitors and a voltage pumping unit (not shown) configured with transfer transistors corresponding to the capacitors. The voltage pumping unit may generate the output voltage Vout by gradually boosting the input voltage Vin based on a first clock signal CLK1 and a second clock signal CLK2. To this end, the clock signal generator 40 may include an oscillator.

The clock signal CLK and the touch driving signals TDS are set to be synchronized with each other. That is, the clock signal CLK and the touch driving signals TDS are set such that the reference timing of the clock signal CLK corresponds to the reference timing of the touch driving signals TDS. Specifically, the reference timing of the clock signal CLK may be at least one of a rising edge and a falling edge of the clock signal CLK. Also, the reference timing of the touch driving signals TDS may be a start point of the sensing time per channel, during which the touch driving signals TDS are supplied to each of the driving channels or each of the sensing electrodes 11 and 12.

In an embodiment, the clock signal generator 40 may generate a clock signal CLK synchronized based on the touch driving signals TDS. The clock signal generator 40 may set or change the reference timing of the clock signal CLK to correspond to the reference timing of the touch driving signals TDS based on predetermined timing information of the touch driving signals TDS.

In another embodiment, the touch driver 20 may generate touch driving signals TDS synchronized based on the clock signal CLK. The touch driver 20 may set or change the reference timing of the touch driving signals TDS to correspond to the reference timing of the clock signal CLK based on predetermined timing information of the clock signal CLK.

In still another embodiment, the clock signal CLK and the touch driving signals TDS may set to be synchronized with each other based on a reference synchronization signal. That is, the clock signal generator 40 and the touch driver 20 may respectively perform synchronizations of the clock signal CLK and the touch driving signals TDS based on a reference synchronization signal provided from the outside or timing information on the reference synchronization signal.

The touch controller 50 detects a touch position based on touch sensing signals TSS other than touch sensing signals TSS overlapped with a transfer section of the clock signal CLK among the touch sensing signals TSS. Here, the transfer section of the clock signal CLK is a point of time when the touch driving signals TDS and the touch sensing signals TSS are influenced by power noise due to driving of the charge pump circuit 30. That is, the touch controller 50 can detect the point of time when the touch driving signals TDS and the touch sensing signals TSS are periodically influenced by power noise based on previously set synchronization timing information and thereby avoid the power noise. The clock signal CLK and the touch driving signals TDS are synchronized with each other, so that it is possible to easily detect a point of time when the touch driving signals TDS and the touch sensing signals TSS are influenced by power noise.

Also, the touch controller 50 detects a touch position by sampling the touch sensing signals TSS to avoid the power noise. Specifically, the touch controller 50 may periodically exclude, from the sampling, touch sensing signals TSS overlapped with the transfer section of the clock signal CLK. Then, the touch controller 50 detects a touch position based on the other touch sensing signals TSS, so that it is possible to prevent a potential touch recognition error due to the power noise from occurring. The touch controller 50 may evaluate a representative value by accumulating and averaging data values obtained by digitizing the touch sensing signals TSS in units of frames. The touch controller 50 may determine whether a touch has been applied by comparing the representative value with a touch reference value.

Figure 2:
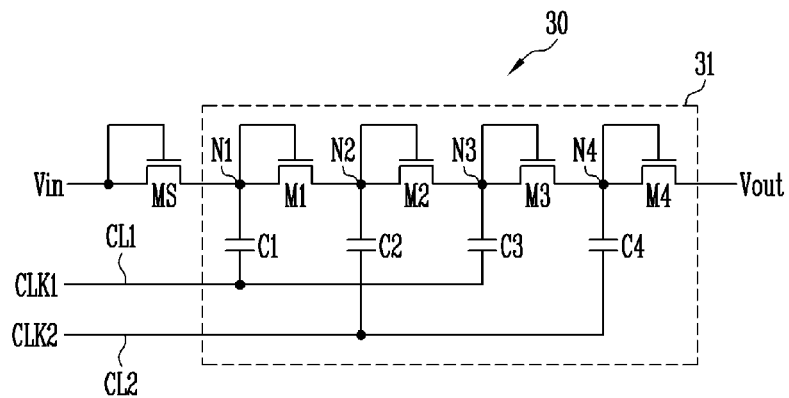
FIG. 2 is a circuit diagram of a charge pump circuit shown in FIG. 1.

FIG. 2 is a circuit diagram of the charge pump circuit shown in FIG. 1.

Referring to FIG. 2, the charge pump circuit 30 includes a source transistor MS and a voltage pumping unit 31.

The voltage pumping unit 31 includes first to fourth transfer transistors M1 to M4 and first to fourth capacitors C1 to C4.

The first to fourth transfer transistors M1 to M4 are coupled, as a plurality of terminals, in series to an output terminal of the source transistor MS. Here, the source transistor MS and the first to fourth transfer transistors M1 to M4 may be N-type metal-oxide semiconductor field effect transistors (MOSFETs).

A first electrode of the first capacitor C1 is electrically coupled to a first node N1 between the source transistor MS and the first transfer transistor M1, and a second electrode of the first capacitor C1 is electrically coupled to a first clock signal line CL1 to which a first clock signal CLK1 is supplied.

A first electrode of the second capacitor C2 is electrically coupled to a second node N2 between the first transfer transistor M1 and the second transfer transistor M2, and a second electrode of the second capacitor C2 is electrically coupled to a second clock signal line CL2 to which a second clock signal CLK2 is supplied.

A first electrode of the third capacitor C3 is electrically coupled to a third node N3 between the second transfer transistor M2 and the third transfer transistor M3, and a second electrode of the third capacitor C3 is electrically coupled to the first clock signal line CL1 to which the first clock signal CLK1 is supplied.

A first electrode of the fourth capacitor C4 is electrically coupled to a fourth node N4 between the third transfer transistor M3 and the fourth transfer transistor M4, and a second electrode of the fourth capacitor C4 is electrically coupled to the second clock signal line CL2 to which the second clock signal CLK2 is supplied.

The first clock signal CLK1 supplied to the first clock signal line CL1 and the second clock signal CLK2 supplied to the second clock signal line CL2 are two-phase clock signals having a phase difference of 180 degrees.

A gate electrode of each of the first to fourth transfer transistors M1 to M4 coupled in series is electrically coupled to its own source electrode in a diode form. In other words, the gate electrode of the first transfer transistor M1 is electrically coupled to the first node N1, the gate electrode of the second transfer transistor M2 is electrically coupled to the second node N2, the gate electrode of the third transfer transistor M3 is electrically coupled to the third node N3, and the gate electrode of the fourth transfer transistor M4 is electrically coupled to the fourth node N4.

As such, the voltage pumping unit 31 generates an output voltage by gradually boosting an input voltage Vin based on the first and second clock signals CLK1 and CLK2 by using the first to fourth transfer transistors M1 to M4.

Figure 3A:
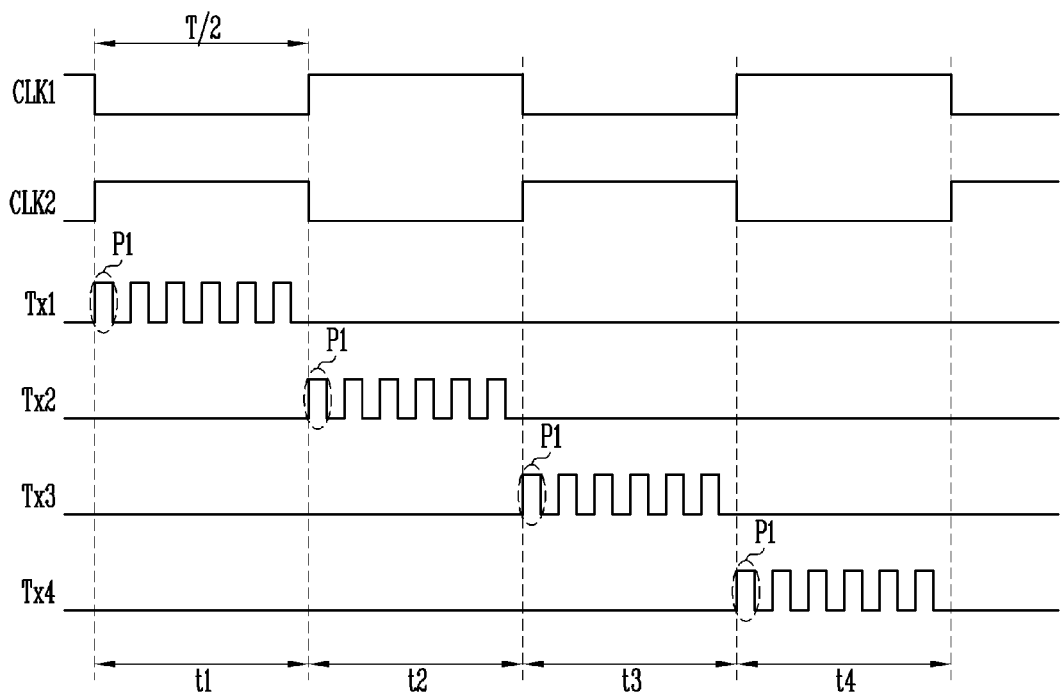
FIGS. 3A and 3B are waveform diagrams illustrating synchronous drives according to embodiments of the present disclosure.
Figure 3B:
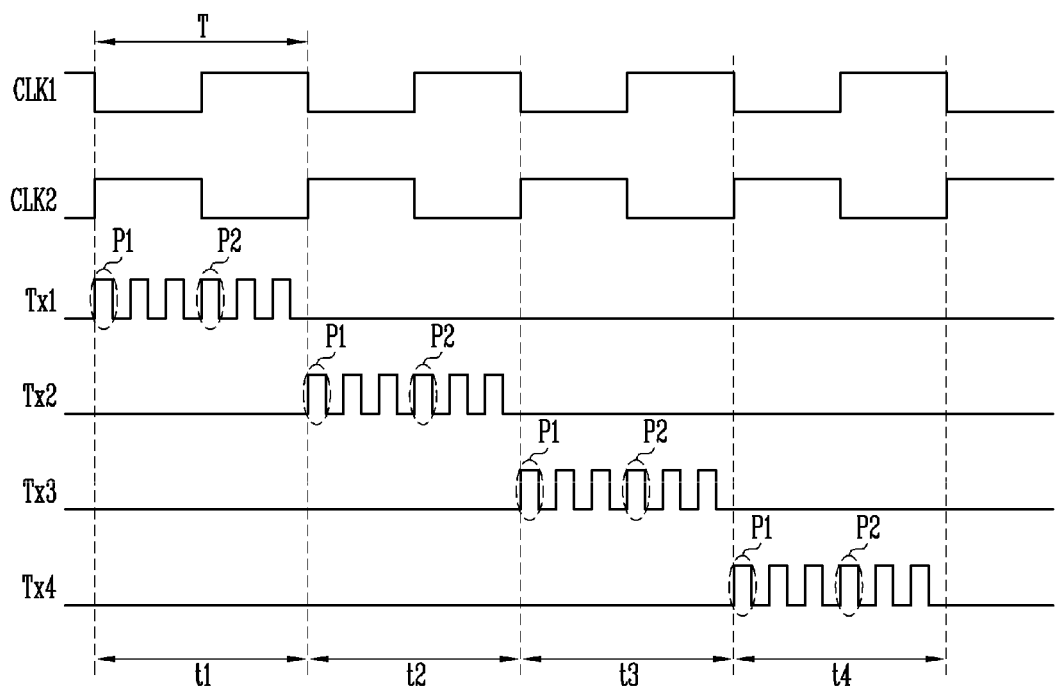

FIGS. 3A and 3B are waveform diagrams illustrating synchronous drives according to embodiments of the present disclosure.

Referring to FIGS. 3A and 3B, in the touch screen panel according to the present disclosure, the touch driver 20 and the charge pump circuit 30 are driven in synchronization with each other. Specifically, transfer points of time (rising and falling edges) of a clock signal CLK for driving the charge pump circuit 30 and start points of sensing times t1 to t4 per channel of touch driving signals TDS for driving the Tx electrodes 11 are set to correspond to each other. Here, the clock signal CLK includes a first clock signal CLK1 and a second clock signal CLK2. The first clock signal CLK1 and the second clock signal CLK2 have the same period T and phases opposite to each other. Thus, the transfer points of time of the first clock signal CLK1 and the second clock signal CLK2 are equal to each other.

Meanwhile, the sensing times t1 to t4 per channel corresponding to the Tx electrodes 11 are not overlapped with each other and have the same temporal length. The Tx electrodes 11 and the driving channels correspond to each other one by one. If it is assumed that the number of the Tx electrodes 11 is four, the sensing times t1 to t4 per channel may be configured as a first time t1, a second time t2, a third time t3, and a fourth time t4, corresponding to the respective Tx electrodes 11. For example, the touch driving signals TDS are supplied to a first Tx electrode Tx1 during the first time t1, the touch driving signals TDS are supplied to a second Tx electrode Tx2 during the second time t2, the touch driving signals TDS are supplied to a third Tx electrode Tx3 during the third time t3, and the touch driving signals TDS are supplied to a fourth Tx electrode Tx4 during the fourth time t4.

In an embodiment, as shown in FIG. 3A, each of the sensing times t1 to t4 per channel may be set to be synchronized with a half period T/2 of the first and second clock signal CLK1 and CLK2. For example, the start point of the first time t1 may have the same timing as the falling edge of the first clock signal CLK1 and the rising edge of the second clock signal CLK2. The start point of the second time t2 may have the same timing as the rising edge of the first clock signal CLK1 and the falling edge of the second clock signal CLK2. The start point of the third time t3 have the same timing as the falling edge of the first clock signal CLK1 and the rising edge of the second clock signal CLK2. The start point of the fourth time t4 have the same timing as the rising edge of the first clock signal CLK1 and the falling edge of the second clock signal CLK2. However, the end point of a preceding time is the same as the start point of a following time. Thus, each of the sensing times t1 to t4 per channel corresponds to the half period T/2 of the first and second clock signals CLK1 and CLK2.

At least one first touch driving signal P1 among the touch driving signals TDS of each of the sensing times t1 to t4 per channel is adjacent to or overlapped with transfer sections of the first and second clock signals CLK1 and CLK2. Hence, the first touch driving signal P1 is influenced by power noise due to driving of the charge pump circuit 30. Thus, the touch controller 50 detects a touch position by sampling touch sensing signals other than the touch sensing signal corresponding to the first touch driving signal P1, so that it is possible to reduce influence of power noise.

In another embodiment, as shown in FIG. 3B, each of the sensing times t1 to t4 per channel may be set to the same timing as a period T of the first and second clock signals CLK1 and CLK2. For example, the start point of each of the first to fourth times t1 to t4 may have the same timing as the falling edge of the first clock signal CLK1 and the rising edge of the second clock signal CLK2.

At least one first touch driving signal P1 and at least one second touch driving signal P2 among the touch driving signals TDS of each of the sensing times t1 to t4 per channel are adjacent to or overlapped with transfer sections of the first and second clock signals CLK1 and CLK2. Hence, the first touch driving signal P1 and the second touch driving signal P2 are influenced by power noise due to driving of the charge pump circuit 30. Thus, the touch controller 50 detects a touch position by sampling touch sensing signals other than the touch sensing signals corresponding to the first touch driving signal P1 and the second touch driving signal P2, so that it is possible to reduce influence of power noise.

As described above, according to the present disclosure, the touch screen panel synchronizes a clock signal for driving the charge pump circuit and touch driving signals applied to the sensing electrodes. Thus, touch driving signals influenced by power noise due to driving of the charge pump circuit have a constant periodicity, and it is easy to detect a point of time when the touch driving signals are influenced by power noise. Further, a touch position is detected based on touch sensing signals less influenced by power noise, so that it is possible to reduce influence of power noise.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, those of skill in the art would understand that various changes in form and details may be made without departing from the spirit and scope of the present disclosure as set forth in the following claims.

What is claimed is:

1. A touch screen panel, comprising:
 a plurality of sensing electrodes arranged in a touch active area;
 a charge pump circuit configured to generate an output voltage by boosting an input voltage based on at least one clock signal;
 a clock signal generator configured to generate the clock signal;
 a touch driver configured to generate touch driving signals by using the output voltage, apply the touch driving signals to the sensing electrodes, and to sense touch sensing signals corresponding to the touch driving signals, wherein the touch sensing signals comprise:
  touch sensing signals influenced by power noise due to driving of the charge pump circuit and overlapped with transfer sections of the clock signal; and
  other touch sensing signals other than the touch sensing signals influenced by power noise due to driving of the charge pump circuit,
 wherein the clock signal and the touch driving signals are synchronized with each other; and
 a touch controller configured to detect a touch position based on the other touch sensing signals and by excluding the touch sensing signals influenced by power noise due to driving of the charge pump circuit and overlapped with transfer sections of the clock signal,
 wherein reference timing of the clock signal and reference timing of the touch driving signals are set to correspond to each other.

2. The touch screen panel of claim 1, wherein the reference timing of the clock signal is at least one of a rising edge and a falling edge of the clock signal.

3. The touch screen panel of claim 1, wherein the touch driver sequentially supplies the touch driving signals to driving channels corresponding to the sensing electrodes.

4. The touch screen panel of claim 3, wherein the reference timing of the touch driving signals is a start point of a sensing time per channel, during which the touch driving signals are supplied to each of the driving channels.

5. The touch screen panel of claim 4, wherein a half period of the clock signal and the sensing time per channel are set to be the same.

6. The touch screen panel of claim 4, wherein a period of the clock signal and the sensing time per channel are set to be the same.

7. The touch screen panel of claim 1, wherein the clock signal generator generates the clock signal synchronized based on the touch driving signals.

8. The touch screen panel of claim 1, wherein the touch driver generates the touch driving signals synchronized based on the clock signal.

9. The touch screen panel of claim 1, wherein the clock signal and the touch driving signals are synchronized based on a reference synchronization signal.

10. The touch screen panel of claim 1, wherein the sensing electrodes include Tx electrodes and Rx electrodes intersecting the Tx electrodes.

11. The touch screen panel of claim 10, wherein the touch driver includes:
 a touch driving circuit configured to supply the touch driving signals to the Tx electrodes; and
 a touch sensing circuit configured to sense the touch sensing signals corresponding to the touch driving signals through the Rx electrodes.

12. The touch screen panel of claim 1, wherein the touch controller detects the touch position from a representative value obtained by averaging the other touch sensing signals.

13. The touch screen panel of claim 1, wherein the clock signal generator generates a first clock signal and a second clock signal obtained by inverting the first clock signal.

14. The touch screen panel of claim 13, wherein the charge pump circuit includes a voltage pumping unit configured with a plurality of capacitors and transfer transistors corresponding to the respective capacitors,
 wherein the voltage pumping unit generates the output voltage by gradually boosting the input voltage based on the first and second clock signals.

* * * * *